(12) United States Patent
Fujita

(10) Patent No.: US 10,643,510 B2
(45) Date of Patent: May 5, 2020

(54) PROJECTION TYPE DISPLAY DEVICE AND PROJECTION CONTROL METHOD FOR HEAD-UP DISPLAY

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/861,680

(22) Filed: Jan. 4, 2018

(65) Prior Publication Data
US 2018/0144672 A1 May 24, 2018

Related U.S. Application Data

(63) Continuation-in-part of application No. PCT/JP2016/069393, filed on Jun. 30, 2016.

(30) Foreign Application Priority Data

Jul. 29, 2015 (JP) .................................. 2015-149988

(51) Int. Cl.
*G06G 3/00* (2006.01)
*G09G 3/00* (2006.01)
(Continued)

(52) U.S. Cl.
CPC ......... *G09G 3/001* (2013.01); *G02B 27/0101* (2013.01); *G09G 5/37* (2013.01);
(Continued)

(58) Field of Classification Search
CPC .... G09G 3/001; G09G 5/37; G09G 2320/066; G09G 2320/0626; G09G 2354/00;
(Continued)

(56) References Cited

U.S. PATENT DOCUMENTS 10,183,622 B2 * 1/2019 Taguchi .................... G09G 5/00
2005/0062937 A1 * 3/2005 Imade ...................... F21S 6/003
353/31
(Continued)

FOREIGN PATENT DOCUMENTS

JP H07257228 10/1995
JP 2006-327310 12/2006
(Continued)

OTHER PUBLICATIONS

"International Search Report (Form PCT/ISA/210)" of PCT/JP2016/069393, dated Aug. 2, 2016, with English translation thereof, pp. 1-5.
(Continued)

*Primary Examiner* — Chun-Nan Lin
(74) *Attorney, Agent, or Firm* — JCIPRNET

(57) ABSTRACT

The projection type display device includes a projection display unit that includes light sources, a light modulation element that spatially modulates light emitted from the light sources, and a projection unit that projects light spatially modulated by the light modulation element onto a projection surface; a sight line detection unit that detects a line of sight; and a system controller that stops projection of the projection light onto the projection surface by the projection display unit in a state where the line of sight detected by the sight line detection unit is out of the projection surface and restarts the projection of the projection light onto the projection surface by the projection display unit after a first time elapses after a timing of moment when the line of sight is determined to move from an outside of the projection surface to an inside of the projection surface.

22 Claims, 4 Drawing Sheets

(51) Int. Cl.
*G02B 27/01* (2006.01)
*G09G 5/37* (2006.01)
*B60K 35/00* (2006.01)
*G03B 21/20* (2006.01)

(52) U.S. Cl.
CPC ........ *B60K 35/00* (2013.01); *B60K 2370/155* (2019.05); *B60K 2370/334* (2019.05); *G02B 2027/014* (2013.01); *G02B 2027/0138* (2013.01); *G03B 21/208* (2013.01); *G03B 21/2013* (2013.01); *G09G 2320/066* (2013.01); *G09G 2320/0626* (2013.01); *G09G 2320/0666* (2013.01); *G09G 2340/14* (2013.01); *G09G 2354/00* (2013.01); *G09G 2380/10* (2013.01)

(58) Field of Classification Search
CPC ....... G09G 2320/0666; G09G 2340/14; G09G 2380/10; G02B 27/0101; G02B 2027/0138; G02B 2027/014; B60K 2350/2052; B60K 35/00; B60K 2350/1072; G03B 21/2013; G03B 21/208
See application file for complete search history.

(56) References Cited

U.S. PATENT DOCUMENTS

| | | | |
|---|---|---|---|
| 2010/0295839 A1 | 11/2010 | Nagaya et al. | |
| 2015/0145411 A1* | 5/2015 | Bae | B60Q 1/143 |
| | | | 315/82 |

FOREIGN PATENT DOCUMENTS

| | | |
|---|---|---|
| JP | 2008030729 | 2/2008 |
| JP | 2009098501 | 5/2009 |
| JP | 2009253786 | 10/2009 |
| JP | 2010269756 | 12/2010 |
| JP | 2010271339 | 12/2010 |
| JP | 2012174057 | 9/2012 |

OTHER PUBLICATIONS

"International Preliminary Report on Patentability (Form PCT/IPEA/409) of PCT/JP2016/069393", dated Mar. 24, 2017, with English translation thereof, pp. 1-9.

* cited by examiner

PROJECTION TYPE DISPLAY DEVICE AND PROJECTION CONTROL METHOD FOR HEAD-UP DISPLAY

CROSS-REFERENCE TO RELATED APPLICATIONS

This application is a Continuation-in-part of PCT International Application No. PCT/JP2016/069393 filed on Jun. 30, 2016, which claims priority under 35 U.S.C § 119(a) to Japanese Patent Application No. 2015-149988 filed on Jul. 29, 2015. Each of the above application(s) is hereby expressly incorporated by reference, in its entirety, into the present application.

BACKGROUND OF THE INVENTION

1. Field of the Invention

The present invention relates to a projection type display device and a projection control method.

2. Description of the Related Art

Inside a vehicle such as an automobile, a train, a heavy machine, an aircraft, or a ship, a vehicle head-up display (HUD) that projects, using a combiner disposed in a front windshield or in the vicinity of the front windshield as a screen, light to the screen to display an image is known (see JP1995-257228A (JP-H07-257228A) and JP2006-327310A). In a case where such an HUD is used, a user (for example, a driver) who is present inside the vehicle may visually recognize an image based on projection light projected from the HUD as a real image on the screen or as a virtual image in front of the screen.

JP1995-257228A (JP-H07-257228A) discloses a vehicle HUD that detects a line of sight of a driver and projects light based on image information onto a projection surface only in a case where a sight line direction is present on a path in front of a vehicle.

JP2006-327310A discloses an HUD that controls a spatial frequency of an image based on projection light so as not to cause focus adjustment reaction of a driver.

SUMMARY OF THE INVENTION

The height of a person, a posture thereof when seated on a driver's seat, or the like varies according to drivers. However, in an HUD, a predetermined region is assumed around the position of the eyes of a representative driver, and a projection range of projection light toward a projection surface is set so that a driver can visually recognize a real image or a virtual image satisfactorily as long as the eyes of the driver are within the predetermined region.

In a state where the projection range of the light and a line of sight of the driver intersect each other, the driver can visually recognize the real image or the virtual image. On the other hand, in a state where the projection range of the projection light and the line of sight of the driver do not intersect each other, the driver cannot visually recognize the real image or the virtual image. During driving of the vehicle, it is necessary to pay attention to a wide range on a front side in a traveling direction, and thus, a state where the projection range of the projection light and the line of sight of the driver do not intersect each other may occur.

In a case where the driver deviates the line of sight from the projection range, and then, returns the line of sight to the projection range, there is a possibility that the driver focuses on the real image or the virtual image based on the light projected to the projection range, rather than a front situation in the projection range, and thus, it takes time until the front situation is recognized.

The HUD disclosed in JP1995-257228A (JP-H07-257228A) has a configuration in which in a case where the line of sight directs toward the path in front of the vehicle from the state where the line of sight is out of the path in front of the vehicle, the light based on the image information is directly projected onto the projection surface. Thus, when the line of sight of the driver returns to the path in front of the vehicle, the driver cannot avoid focusing on the real image or the virtual image capable of being directly visually recognized, and thus, it may take time until the situation of the path in front of the vehicle is recognized.

JP2006-327310A does not consider an operation in a case where the line of sight deviates from the projection range.

The invention has been made in consideration of the above-mentioned problems, and an object of the invention is to provide a projection type display device and a projection control method capable of accurately recognizing a situation in a traveling direction even in a situation where a line of sight of a driver complicatedly changes.

According to an aspect of the invention, there is provided a projection type display device comprising: a projection display unit that includes a light source, a light modulation element that spatially modulates light emitted from the light source, and a projection unit that projects light spatially modulated by the light modulation element onto a projection surface mounted in a vehicle as projection light; a sight line detection unit that detects a line of sight of a driver of the vehicle; and a projection controller that stops projection of the projection light onto the projection surface by the projection display unit in a state where the line of sight detected by the sight line detection unit is out of the projection surface and restarts the projection of the projection light onto the projection surface by the projection display unit after a first time elapses after a timing of moment when the line of sight is determined to move from an outside of the projection surface to an inside of the projection surface, wherein the projection controller enhances visibility of an image formed by the projection light with the lapse of time in a case where the projection of the projection light onto the projection surface is restarted.

According to another aspect of the invention, there is provided a projection control method in a projection type display device including a projection display unit that includes a light source, a light modulation element that spatially modulates light emitted from the light source, and a projection unit that projects light spatially modulated by the light modulation element onto a projection surface mounted in a vehicle; and a sight line detection unit that detects a line of sight of a driver of the vehicle, the method comprising: a projection control step of stopping projection of the projection light onto the projection surface by the projection display unit in a state where the line of sight detected by the sight line detection unit is out of the projection surface and restarting the projection of the projection light onto the projection surface by the projection display unit after a first time elapses after a timing of moment when the line of sight is determined to move from an outside of the projection surface to an inside of the projection surface, wherein, in the projection control step, visibility of an image formed by the projection light is enhanced with the lapse of time in a case where the projection of the projection light onto the projection surface is restarted.

According to the invention, it is possible to provide a projection type display device and a projection control method capable of accurately recognizing a situation in a traveling direction even in a situation where a line of sight of a driver is complicatedly changed.

DESCRIPTION OF THE PREFERRED EMBODIMENTS

Hereinafter, embodiments of the invention will be described with reference to the accompanying drawings.

Figure 1:
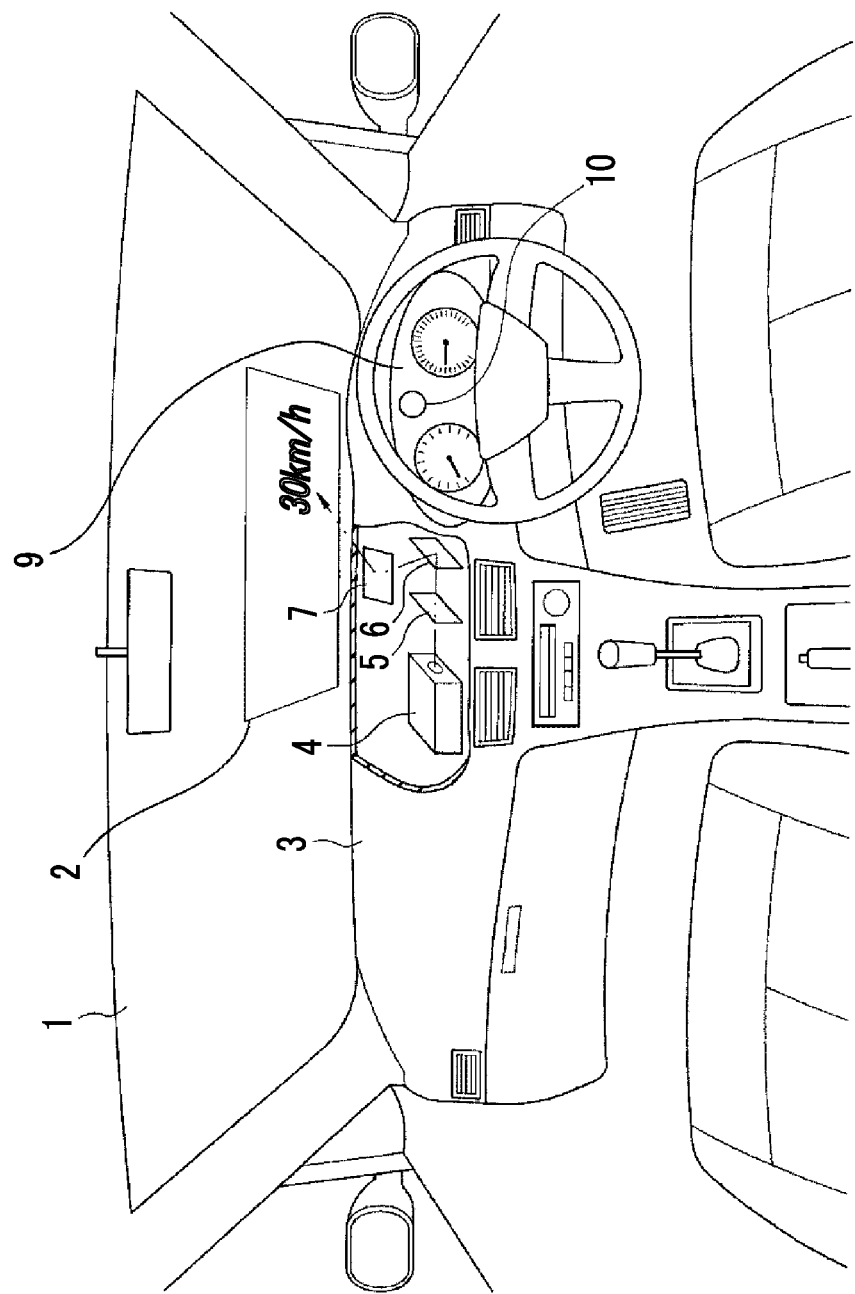
FIG. 1 is a conceptual diagram showing a configuration of an HUD according to an embodiment of a projection type display device of the invention.

FIG. 1 is a diagram showing a schematic configuration of an HUD according to an embodiment of a projection type display device of the invention. The HUD is mounted on an automobile, and causes, using a partial range of a front windshield 1 as a projection surface 2 of light, a driver of the automobile to visually recognize a virtual image formed by the light projected onto the projection surface 2. The HUD in FIG. 1 may be mounted and used in a vehicle such as a train, a heavy machine, a construction machine, an aircraft, or a ship, as well as an automobile.

The HUD shown in FIG. 1 includes a light source unit 4 that is provided in a dashboard 3 of an automobile, a diffuser plate 5, a reflecting mirror 6 and a magnifying glass 7 that are provided in the dashboard 3, and an imaging unit 10 that is attached to a gauge board 9 that is provided on a driver's seat side of the dashboard 3.

The diffuser plate 5 diffuses light emitted from the light source unit 4 to make a plane light source. The reflecting mirror 6 reflects the light that is diffused to the plane light source by the diffuser plate 5 toward the magnifying glass 7. The magnifying glass 7 magnifies the light from the reflecting mirror 6, and projects the magnified light to the projection surface 2 that is a partial range of the front windshield 1. The projection surface 2 is processed such that the light projected from the magnifying glass 7 is reflected toward the eyes of a driver. Here, a configuration in which light is projected onto the front windshield 1 is shown, but a configuration in which light is projected onto a combiner that is disposed in the vicinity of the front windshield 1 may be used. In this case, the combiner forms the projection surface 2.

A driver of an automobile may visually recognize pictures, characters or the like of information relating to driving using a virtual image based on light that is projected onto the projection surface 2 and is reflected from the projection surface 2. Further, the projection surface 2 has a function of transmitting light from the outside of the front windshield 1 (external side of the car). Thus, the driver may visually recognize an image obtained by superimposing a virtual image based on the light projected from the magnifying glass 7 and a scene of the outside world.

The imaging unit 10 attached to the gauge board 9 images the face of the driver who is sits on a driver's seat, and is connected to the light source unit 4 in a wired or wireless manner. Data on a captured image of the face of the driver obtained by the imaging unit 10 is transmitted to the light source unit 4 in a wired or wireless manner.

The imaging unit 10 may be attached to a location other than the gauge board 9 as long as the face of the driver can be imaged at the location. As the imaging unit 10, an imaging unit that is provided for usage different from that of the HUD in the automobile may be used.

Figure 2:
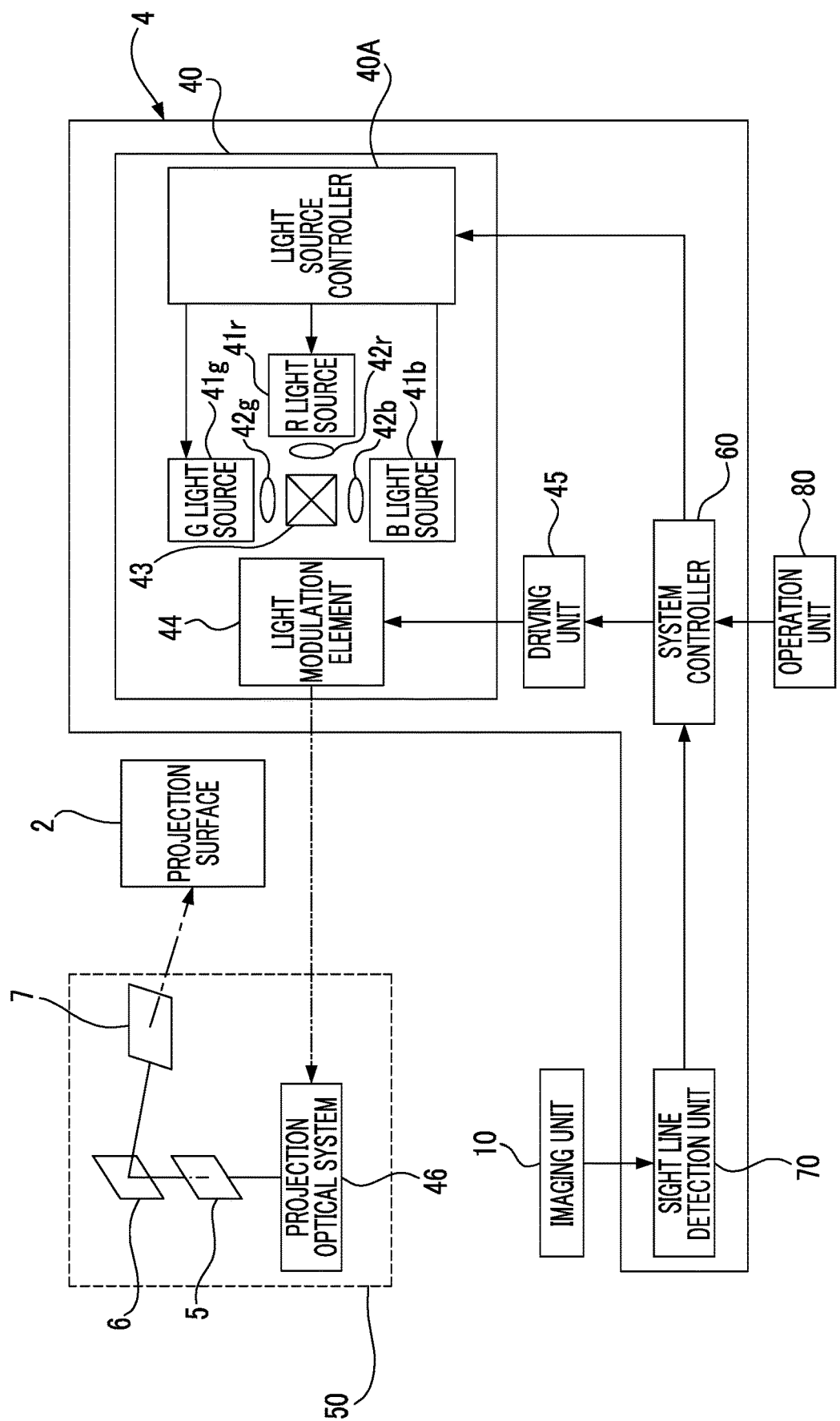
FIG. 2 is a schematic diagram showing a detailed configuration of the HUD shown in FIG. 1.

FIG. 2 is a schematic diagram showing a detailed configuration of the HUD shown in FIG. 1.

As shown in FIG. 2, the HUD includes the light source 4, a projection unit 50, the imaging unit 10, and an operation unit 80.

The light source unit 4 includes a light source unit 40, a driving unit 45 that drives a light modulation element 44 included in the light source unit 40, a system controller 60 that generally controls the entire system, and a sight line detection unit 70. The system controller 60 functions as a projection controller.

The light source unit 40 includes a light source controller 40A, an R light source 41r that is a red light source that emits red light, a G light source 41g that is a green light source that emits green light, a B light source 41b that is a blue light source that emits blue light, a dichroic prism 43, a collimator lens 42r that is provided between the R light source 41r and the dichroic prism 43, a collimator lens 42g that is provided between the G light source 41g and the dichroic prism 43, a collimator lens 42b that is provided between the B light source 41b and the dichroic prism 43, and a light modulation element 44. The R light source 41r, the G light source 41g, and the B light source 41b form light sources of the HUD.

The R light source 41r, the G light source 41g, and the B light source 41b respectively employ a light emitting element such as laser or a light emitting diode. In this embodiment, an example in which the HUD includes three light sources of the R light source 41r, the G light source 41g, and the B light source 41b is shown, but the number of light sources may be 1, 2, 4 or more.

The light source controller 40A sets the amounts of luminescence of the R light source 41r, the G light source 41g, and the B light source 41b into predetermined luminescence amount patterns, and performs a control for sequentially emitting light from the R light source 41r, the G light source 41g, and the B light source 41b according to the luminescence amount patterns.

The dichroic prism 43 is an optical member for guiding light emitted from each of the R light source 41r, the G light source 41g, and the B light source 41b to the same optical path. The dichroic prism 43 transmits red light that is collimated by the collimator lens 42r to be emitted to the light modulation element 44. Further, the dichroic prism 43 reflects green light that is collimated by the collimator lens 42g to be emitted to the light modulation element 44. Further, the dichroic prism 43 reflects blue light that is collimated by the collimator lens 42b to be emitted to the light modulation element 44. An optical member having a function of guiding light to the same optical path is not limited to a dichroic prism. For example, a cross dichroic mirror may be used.

The light modulation element 44 spatially modulates light emitted from the dichroic prism 43 on the basis of projection image data that is image information, and emits light (red color image light, blue color image light, and green color image light) based on the projection image data to the projection unit 50. The image information includes, for example, information indicating a traveling speed of an automobile, information for performing notification to a driver, navigation information, or the like.

The light modulation element 44 may employ, for example, a liquid crystal on silicon (LCOS), a digital micromirror device (DMD), a micro electro mechanical systems (MEMS) element, a liquid crystal display device, or the like.

The driving unit 45 drives the light modulation element 44 according to projection image data input through the system controller 60, and emits light based on the projection image data to the projection unit 50.

The projection unit 50 includes a projection optical system 46, the diffuser plate 5, the reflecting mirror 6, and the magnifying glass 7.

The projection optical system 46 is an optical system for projecting light that is spatially modulated by the light modulation element 44 onto the diffuser plate 5. The optical system is not limited to a lens, and may employ a scanner.

The projection unit 50 forms a projection unit that projects the light that is spatially modulated by the light modulation element 44 onto the projection surface 2. The projection surface 2 becomes a projection range of light (hereinafter, referred to as projection light) projected by the projection unit 50. The projection unit 50 is optically designed so that an image based on the light projected onto the projection surface 2 can be visually recognized by a driver as a virtual image at a position in front of the front windshield 1.

The light sources including the R light source 41r, the G light source 41g and the B light source 41b, the light modulation element 44, and the projection unit 50 form a projection display unit.

The system controller 60 controls the light source controller 40A and the driving unit 45, and emits light based on the projection image data to the projection unit 50 from the light source unit 40.

The sight line detection unit 70 acquires captured image data obtained by imaging of the imaging unit 10, and performs a known sight line detection process with respect to data of the acquired captured image to detect a line of sight of a driver of an automobile in which an HUD is mounted. The sight line detection unit 70 notifies the system controller 60 of the sight line detection result.

The operation unit 80 includes a display (for example, a touch panel display disposed in a center console) and operation buttons, and the like that are mounted in an automobile, and is an interface for causing the system controller 60 to perform various instructions.

The system controller 60 determines whether a line of sight of a driver is within the projection range (projection surface 2) of light toward the front windshield 1 by the projection unit 50, on the basis of the sight line detection result of the sight line detection unit 70.

In a case where the line of sight is within the projection surface 2, the line of sight detected by the sight line detection unit 70 intersects the projection surface 2. In a case where the line of sight is out of the projection surface 2, the line of sight detected by the sight line detection unit 70 does not intersect the projection surface 2.

In a state where the line of sight detected by the sight line detection unit 70 is out of the projection surface 2, the system controller 60 stops the projection of the projection light onto the projection surface 2 by the projection display unit.

Further, in a case where it is determined that the line of sight detected by the sight line detection unit 70 moves from the state of being out of the projection surface 2 to the state of being within the projection surface 2, the system controller 60 restarts the projection of the projection light onto the projection surface 2 by the projection display unit.

As a method for stopping the projection of the projection light onto the projection surface 2 by the projection display unit, a first method for controlling the driving unit 45 so that light is not emitted from the light modulation element 44, a second method for controlling the light source controller 40A to stop the light sources, a third method for stopping the entirety of the light source unit 40 or setting the entirety of the light source unit 40 to enter a standby state, or the like may be used.

According to the second method or the third method, it is possible to reduce power consumption or heat generation of an HUD. The restarting of the projection of the projection light onto the projection surface 2 by the projection display unit is performed by a control for emitting light based on projection image data from the light modulation element 44, a control for starting the light sources, a control for starting the entirety of the light source unit 40 or releasing the standby state thereof, or the like.

Further, in the projection unit 50, a shutter (not shown) for shielding light may be disposed to be removably inserted on an optical path between the projection optical system 46 and the diffuser plate 5, and the system controller 60 may perform a control for closing the shutter to stop the projection of the projection light onto the projection surface 2 by the projection display unit. The position of the shutter may be any position on the projection optical path.

According to this method, when the projection of the projection light is restarted from the state where the projection of the projection light is stopped, it is possible to restart the projection of the projection light onto the projection surface 2 only by opening the shutter. Thus, it is possible to extremely shorten the time until a virtual image can be visually recognized with respect to a driver after it is determined that the system controller 60 restarts projection of light. Further, since the light source unit 40 does not repeat starting and stopping, it is possible to enhance durability of the light source unit 40.

Figure 3:
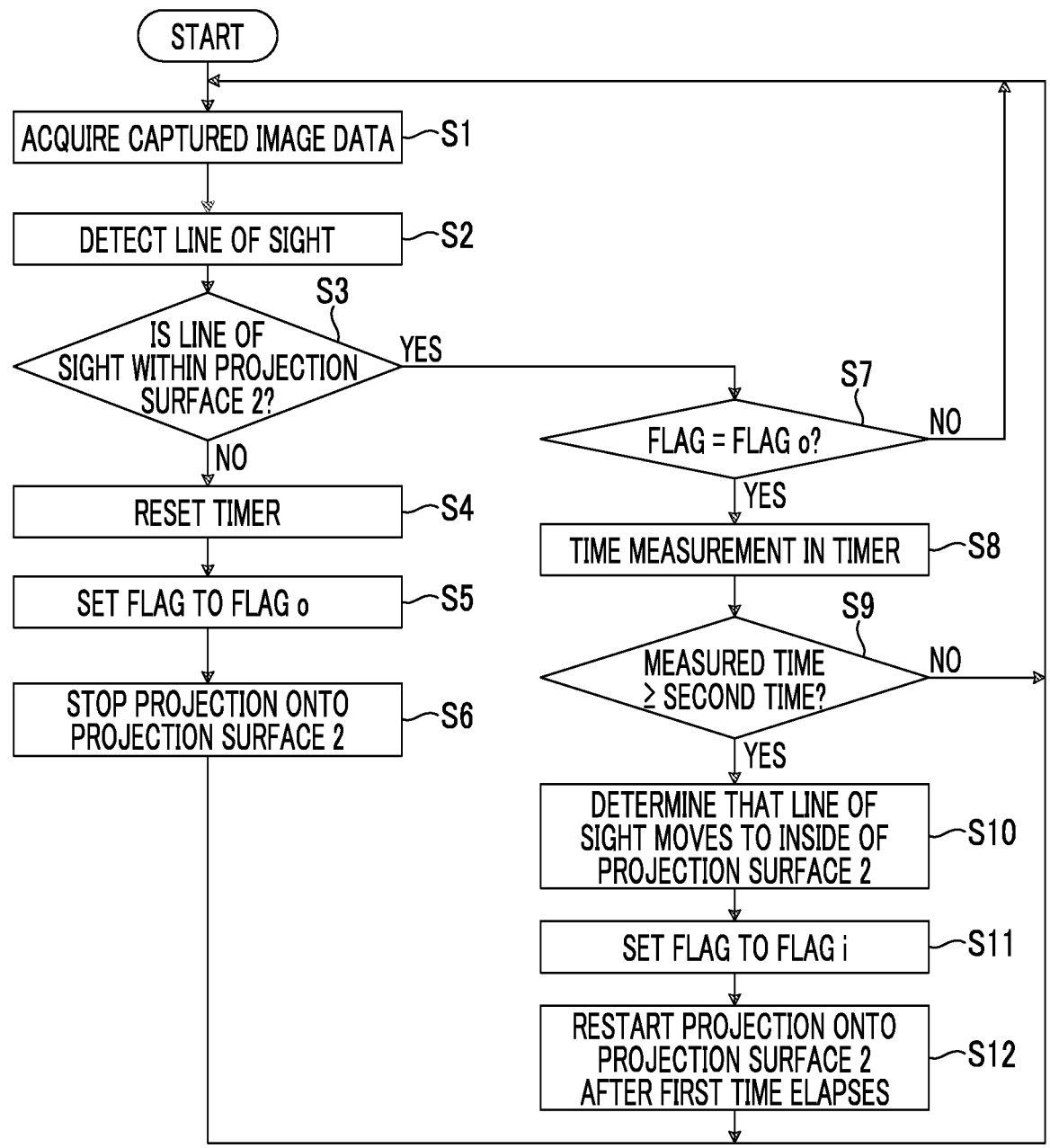
FIG. 3 is a flowchart for illustrating an operation of the HUD shown in FIG. 1.

FIG. 3 is a flowchart for illustrating an operation of the HUD shown in FIG. 1.

In a case where the HUD is started, the system controller 60 starts projection of projection light onto the projection surface 2 by the projection display unit. Then, the sight line detection unit 70 acquires captured image data captured by the imaging unit 10 (step S1).

Thereafter, the sight line detection unit 70 detects a line of sight of a driver on the basis of the captured image data acquired in step S1 (step S2).

After step S2, the system controller 60 determines whether the line of sight of the driver detected by the sight line detection unit 70 is within the projection surface 2 (step S3). In a case where it is determined that the line of sight of the driver is out of the projection surface 2 (NO in step S3), the system controller 60 resets an internal timer (step S4).

After step S4, the system controller 60 sets a flag stored in an internal memory to "flag o" indicating a state where the line of sight is out of the projection surface 2 (step S5), and stops the light source unit 40 or causes the light source unit 40 to enter a standby state to stop the projection of the projection light onto the projection surface 2 by the projection display unit (step S6). After the process of step S6, the procedure returns to the process of step S1.

In a case where it is determined in step S3 that the line of sight of the driver is within the projection surface 2 (YES in step S3), the system controller 60 determines whether the flag in the internal memory is set to "flag o" (step S7).

In a case where the flag in the internal memory is set to "flag i" indicating a state where the line of sight is within the projection surface 2 (NO in step S7), the procedure returns to the process of step S1.

In a case where the flag in the internal memory is set to "flag o" (YES in step S7), the system controller 60 starts time measurement by the internal timer (step S8).

Then, the system controller 60 determines, with reference to a measured time of the internal timer, whether the measured time is equal to or longer than a second time (for example, 1 second) (step S9).

In a case where the measured time of the internal timer is shorter than the second time (NO in step S9), the procedure returns to step S1, and then, the above-described processes are repeated.

In a case where the measured time of the internal timer is equal to or longer than the second time (YES in step S9), the system controller 60 determines that the line of sight of the driver moves from the outside of the projection surface 2 to the inside of the projection surface 2 (step S10), and then, sets the flag of the internal memory to "flag i" (step S11).

For example, a driver may confirm a rearview mirror or a side mirror in changing of a traffic lane, and under such a situation where the line of sight is complicatedly changed, the driver repeats turning the line of sight into the projection surface 2 and turning the line of sight out of the projection surface 2 in a short time.

In this way, under the situation where the line of sight greatly moves, in a case where the projection of the light by the projection display unit is restarted just because the line of sight moves from the outside of the projection surface 2 to the inside of the projection surface 2, in a case where the line of sight immediately moves out of the projection surface 2, the projection of the light should be immediately stopped. That is, projection and non-projection of light should be frequently repeated.

In order to prevent such a problem, the system controller 60 determines, only in a case where the line of sight of the driver enters the projection surface 2 from the state of being out of the projection surface 2 and the state where the line of sight is within the projection surface 2 is continued for the second time (YES in step S9), that the line of sight of the driver moves from the outside of the projection surface 2 to the inside of the projection surface 2.

Further, after it is determined that the line of sight of the driver moves from the outside of the projection surface 2 to the inside of the projection surface 2, and after a first time (for example, about 1 second to 4 seconds) elapses, the system controller 60 starts the light source unit 40 and inputs projection image data to the driving unit 45. Through the driving of the driving unit 45, the light modulation element 44 spatially modulates light emitted from the light source unit 40 in accordance with the projection image data. The spatially modulated light is projected onto the projection surface 2 from the projection unit 50, and the projection of the projection light, that is, projection of a virtual image is restarted (step S12). After the process of step S12, the procedure returns to step S1.

As described above, when using the HUD shown in FIG. 1, in a case where a line of sight of a driver is out of the projection surface 2, projection of projection light onto the projection surface 2 is stopped. Further, in a case where it is determined that the line of sight of the driver moves from the outside of the projection surface 2 to the inside of the projection surface 2, the projection of the projection light onto the projection surface 2 is restarted after the first time elapses after a timing of moment when the determination is made.

In this way, even in a case where the driver moves the line of sight from the outside of the projection surface 2 to the inside of the projection surface 2, light is not projected onto the projection surface 2 until the first time elapses. Thus, it is possible to avoid focusing on a virtual image, and thus, to accurately recognize a situation in a traveling direction. The first time may be determined as an appropriate value on the basis of human engineering, or may be set to a period of time of about 1 second to 4 seconds as described above.

Further, when using the HUD shown in FIG. 1, in a state where the line of sight is out of the projection surface 2, the light source unit 40 may be stopped, or may transition to a standby state. Thus, it is possible to reduce power consumption of the HUD.

In addition, in the HUD shown in FIG. 1, only in a case where the line of sight of the driver enters the projection surface 2 from the state of being out of the projection surface 2 and the state where the line of sight is within the projection surface 2 is continued for the second time (YES in step S9), the projection of the light onto the projection surface 2 is restarted after the first time elapses.

Thus, under a situation where the driver rapidly moves the line of sight, it is possible to prevent a state where light is projected onto the projection surface 2 and a state where light is not projected onto the projection surface 2 from being frequently switched. Accordingly, it is possible to enhance durability of the HUD, and enhance a feeling of a driver or passengers in using the HUD. The second time may be a period of time during which it is possible to determine that the line of sight becomes stable. The second time may be experimentally determined, or may be a value that is changed in real time on the basis of a history of the line of sight of the driver.

In FIG. 3, when the determination in step S7 is YES, the procedure may immediately proceed to step S10. In this case, step S8 is deleted. Further, when the determination in step S7 is NO, the procedure proceeds to the process of step S1. Further, in this case, it is preferable to set the first time to about 1 second to 5 seconds. Even in such an operation, when the line of sight moves from the outside of the projection surface 2 to the inside of the projection surface 2, since a virtual image is not immediately presented to the driver, it is possible to prevent a situation where the driver focuses on a virtual image to hardly pay attention to the background, and thus, to accurately recognize a situation in a traveling direction.

Further, it is preferable to manually set the first time in step S12 in FIG. 3. Specifically, a restarting time setting screen may be displayed on the display (touch panel) that is the operation unit 80, and the first time may be arbitrarily set by a button operation on the screen. Here, the shortest time (for example, 1 second) of the first time is determined in advance, and the first time cannot be set to a time shorter than the shortest time. With this configuration, it is possible to prevent projection of a virtual image from being restarted immediately after it is determined that a line of sight of a driver moves to the inside of the projection surface 2.

In addition, in step S12 in FIG. 3, when the projection of the projection light onto the projection surface 2 is restarted, the system controller 60 may not maximize visibility of a virtual image from the beginning, and instead, may perform a control for gradually increasing the visibility with the lapse of time. In this way, by gradually increasing the visibility of the virtual image, it is possible to restart presentation of the virtual image with respect to the driver in a natural manner.

Specifically, the system controller 60 changes the projection image data input to the driving unit 45 in step S12 with the lapse of time.

Figure 4A:
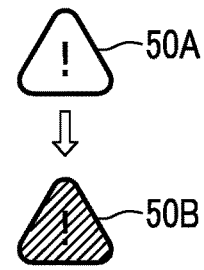
FIGS. 4A, 4B and 4C are diagrams showing an example of a display change method of icons in restarting of projection.

FIG. 4A shows, as icons (icons in which a character "!" is written) for attracting attention of a driver, an icon 50A in which only a borderline is present and a portion other than an inner character is transparent, and an icon 50B in which a portion other than an inner character is painted with a color different from that of the character. As transmittance of the painted region in the icon becomes higher, the background is more easily recognized, but visibility as the icon becomes lower.

The system controller 60 inputs projection image data for displaying the icon 50A to the driving unit 45, and inputs, after a predetermined time elapses, projection image data for displaying the icon 50B to the driving unit 45 in step S12, to thereby enhance visibility of the icons with the lapse of time.

Here, the display of the icon is changed at two stages, but may be changed at three or more stages. In this case, projection image data may be changed so that the density of the painted color inside the icon is gradually increased from the icon 50A to the icon 50B.

Figure 4B:
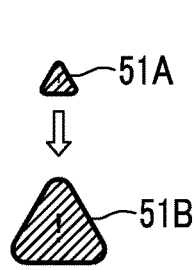

FIG. 4B shows a small icon 51A and a large icon 51B as icons for attracting attention of a driver. As the size of the icon is smaller, the background is more easily confirmed, but visibility of the icon becomes lower.

The system controller 60 inputs projection image data for displaying the icon 51A to the driving unit 45, and inputs, after a predetermined time elapses, projection image data for displaying the icon 51B to the driving unit 45 in step S12, to thereby enhance visibility of the icons with the lapse of time.

Here, the size of the icon is changed at two stages, but may be changed at three or more stages. In this case, the projection image data may be changed so that the size of the icon is gradually increased from the icon 51A to the icon 51B.

Figure 4C:
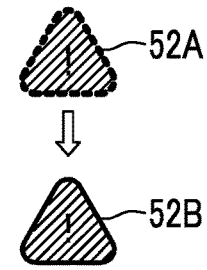

FIG. 4C shows an icon 52A having a low brightness and an icon 52B having a high brightness as icons for attracting attention of a driver. As the brightness of the icon is lower, the background is more easily confirmed, but visibility of the icon becomes lower.

The system controller 60 inputs projection image data for displaying the icon 52A to the driving unit 45, and inputs, after a predetermined time elapses, inputs projection image data for displaying the icon 52B to the driving unit 45 in step S12, to thereby enhance visibility of the icon with the lapse of time.

Here, the brightness of the icon is changed at two stages, but may be changed at three or more stages. In this case, the projection image data may be changed so that the brightness is gradually increased from the icon 52A to the icon 52B. Here, the visibility is changed, but saturation instead of the brightness may be changed. By gradually increasing the saturation, it is possible to enhance the visibility.

The three visibility changing methods shown in FIGS. 4A, 4B, and 4C may be manually selected by an operator of the HUD.

Figure 5A:
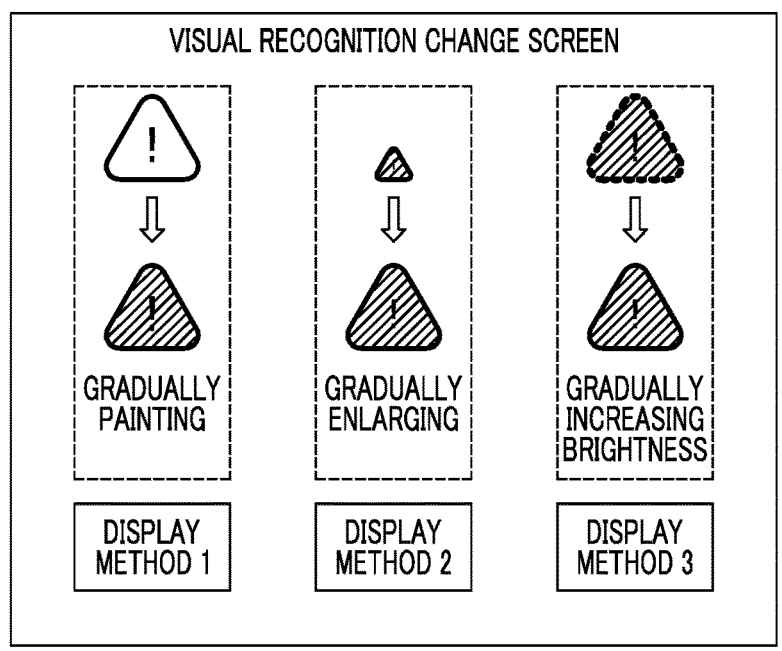
FIGS. 5A and 5B are diagrams for illustrating a manual operation of visibility change.
Figure 5B:
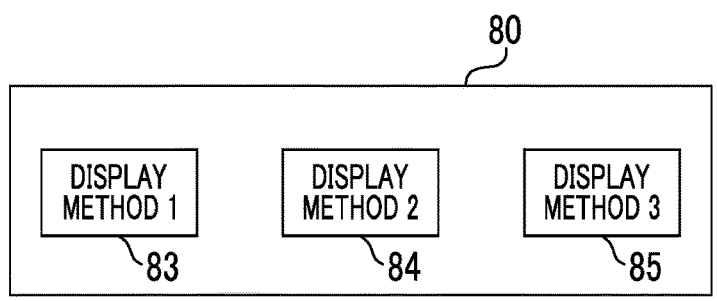

For example, with respect to projection of projection light onto the projection surface 2, a visual recognition change screen shown in FIG. 5A is presented as a virtual image, and as shown in FIG. 5B, operation buttons 83 to 85 are displayed on the display (touch panel) of the operation unit 80.

The operation buttons 83 to 85 displayed on the operation unit 80 are associated with the visible recognition change methods (display methods 1 to 3) on the visible recognition change screen in FIG. 5A. A driver may confirm an actual appearance while confirming the visual recognition change screen shown in FIG. 5A, and may select any one of the operation buttons 83 to 85 corresponding to a desired display method to arbitrarily set a visibility changing method.

The operation unit 80 is configured by a display (for example, a display with a touch panel disposed in a center console), operation buttons, and the like mounted in an automobile, but a configuration in which a communication unit that communicates with an electronic device possessed by a driver or passenger is provided in an automobile and a signal operated by the electronic device is received through the communication unit and is output to the system controller 60 may be used. The communication unit may be provided in the HUD.

The electronic device may be a portable type computer such as a smartphone, a cellular phone with a camera, a tablet terminal (personal digital assistant), and may be any device the can display an operation screen shown in FIG. 5B and can receive input of a variety of information. With this configuration, it is possible to perform the same operation as the operation unit 80.

In HUD in FIG. 1, an optical system optically designed so that an image based on light projected onto the projection surface 2 can be visually recognized by a driver as a real image on the projection surface 2 may be used as the projection unit 50. In this case, similarly, in a case where the driver moves the line of sight from the outside of the projection surface 2 to the inside of the projection surface 2, the light is not projected onto the projection surface 2 until the first time elapses. Thus, it is possible to avoid focusing on a real image displayed on the projection surface 2, and to accurately recognize a situation in a traveling direction.

As described above, the following items are disclosed in this specification.

A disclosed projection type display device includes: a projection display unit that includes a light source, a light modulation element that spatially modulates light emitted from the light source, and a projection unit that projects light spatially modulated by the light modulation element onto a projection surface mounted in a vehicle as projection light; a sight line detection unit that detects a line of sight of a driver of the vehicle; and a projection controller that stops projection of the projection light onto the projection surface by the projection display unit in a state where the line of sight detected by the sight line detection unit is out of the projection surface and restarts the projection of the projection light onto the projection surface by the projection display unit after a first time elapses after a timing of moment when the line of sight is determined to move from an outside of the projection surface to an inside of the projection surface.

The disclosed projection type display device is configured so that the projection controller determines that the line of sight moves from the outside of the projection surface to the inside of the projection surface in a case where the line of sight detected by the sight line detection unit moves from a state where the line of sight detected by the sight line detection unit is out of the projection surface to a state where the line of sight detected by the sight line detection unit is within the projection surface and the line of sight detected by the sight line detection unit is continuously within the projection surface for a second time.

The disclosed projection type display device is configured so that the projection controller enhances visibility of an image formed by the projection light with the lapse of time in a case where the projection of the projection light onto the projection surface is restarted.

The disclosed projection type display device is configured so that a method for changing the visibility of the image is settable manually.

The disclosed projection type display device is configured so that the first time is settable manually.

The disclosed projection type display device is configured so that the projection unit projects the projection light onto the projection surface to visually recognize an image based on the projection light as a real image or a virtual image.

A disclosed projection control method in a projection type display device including a projection display unit that includes a light source, a light modulation element that spatially modulates light emitted from the light source, and a projection unit that projects light spatially modulated by the light modulation element onto a projection surface mounted in a vehicle as projection light; and a sight line detection unit that detects a line of sight of a driver of the vehicle, includes: a projection control step of stopping projection of the projection light onto the projection surface by the projection display unit in a state where the line of sight detected by the sight line detection unit is out of the projection surface and restarting the projection of the projection light onto the projection surface by the projection display unit after a first time elapses after a timing of moment when the line of sight is determined to move from an outside of the projection surface to an inside of the projection surface.

The disclosed projection control method is configured so that, in the projection control step, it is determined that the line of sight moves from the outside of the projection surface to the inside of the projection surface in a case where the line of sight detected by the sight line detection unit moves from a state where the line of sight detected by the sight line detection unit is out of the projection surface to a state where the line of sight detected by the sight line detection unit is within the projection surface and the line of sight detected by the sight line detection unit is continuously within the projection surface for a second time.

The disclosed projection control method is configured so that, in the projection control step, visibility of an image formed by the projection light is enhanced with the lapse of time in a case where the projection of the projection light onto the projection surface is restarted.

The disclosed projection control method is configured so that the projection unit projects the projection light onto the projection surface to visually recognize an image based on the projection light as a real image or a virtual image.

In the above-described embodiment, hardware structures of processing units, which execute various kinds of processing, such as the light source controller 40A, the system controller 60 and the sight line detection unit 70 are various processors as illustrated below. Various processors include exclusive electric circuits, which are processors having circuit configurations exclusively designed to execute specific processing, such as a central processing unit (CPU) that is a general-purpose processor that executes software (programs) to function as various processing units, a programmable logic device (PLD) that is a processor capable of changing a circuit configuration after manufacture of a field programmable gate array (FPGA) or the like, and an application specific integrated circuit (ASIC).

One processing unit may be constituted of one of these various processors, or may be constituted of two or more same or different processors (for example, a plurality of the FPGAs or a combination of the CPU and the FPGA). Additionally, the plurality of processing units may be constituted of one processor. As an example in which the plurality of processing units are constituted of the one processor, firstly, as represented by a computer, such as a client or a server, there is a form in which one processor is constituted of a combination of one or more CPUs and software and this processor functions as a plurality of processing units. Secondly, as represented by a system-on-chip (SOC) or the like, there is a form in which a processor, which realizes functions of an overall system including a plurality of processing units with one integrated circuit (IC) chip, is used. In this way, the various processing units are configured by using one or more of the above various processors as the hardware structure(s).

Moreover, the hardware structures of these various processors are more specifically circuitries in which circuit elements, such as semiconductor elements, are combined together.

The projection type display device of the invention is particularly mounted in an automobile, which provides high comfort and effectiveness.

EXPLANATION OF REFERENCES

2: projection surface
10: imaging unit
40: light source unit
44: light modulation element
45: driving unit
50: projection unit
60: system controller
70: sight line detection unit

What is claimed is:
1. A projection type display device comprising:
a projection display unit that includes a light source, a light modulation element that spatially modulates light emitted from the light source, and a projection unit that projects light spatially modulated by the light modulation element onto a transparent projection surface mounted in a vehicle as projection light;
a sight line detection unit that detects a line of sight of a driver of the vehicle; and
a projection controller that stops projection of the projection light onto the transparent projection surface by the projection display unit in a state where the line of sight detected by the sight line detection unit is out of the transparent projection surface and restarts the projection of the projection light onto the transparent projection surface by the projection display unit after a first time elapses after a timing of moment when the line of sight is determined to move from an outside of the transparent projection surface to an inside of the transparent projection surface,
wherein the projection display unit forms an image by the projection light reflected at the transparent projection surface so that the driver visually recognizes the image in conjunction with a scene outside the vehicle, and wherein the projection controller gradually increases visibility of the image formed by the projection light with the lapse of time in a case where the projection of the projection light onto the transparent projection surface is restarted.

2. The projection type display device according to claim 1,
wherein the projection controller determines that the line of sight moves from the outside of the transparent projection surface to the inside of the transparent projection surface in a case where the line of sight detected by the sight line detection unit moves from a state where the line of sight detected by the sight line detection unit is out of the transparent projection surface to a state where the line of sight detected by the sight line detection unit is within the transparent projection surface and the line of sight detected by the sight line detection unit is continuously within the transparent projection surface for a second time.

3. The projection type display device according to claim 1,
wherein the visibility of the image is settable manually.

4. The projection type display device according to claim 2,
wherein the visibility of the image is settable manually.

5. The projection type display device according to claim 1,
wherein the first time is settable manually.

6. The projection type display device according to claim 2,
wherein the first time is settable manually.

7. The projection type display device according to claim 3,
wherein the first time is settable manually.

8. The projection type display device according to claim 4,
wherein the first time is settable manually.

9. The projection type display device according to claim 1,
wherein the projection unit projects the projection light onto the transparent projection surface so that a user who is present inside the vehicle visually recognizes the image based on the projection light as a real image or a virtual image.

10. The projection type display device according to claim 2,
wherein the projection unit projects the projection light onto the transparent projection surface so that a user who is present inside the vehicle visually recognizes the image based on the projection light as a real image or a virtual image.

11. The projection type display device according to claim 3,
wherein the projection unit projects the projection light onto the transparent projection surface so that a user who is present inside the vehicle visually recognizes the image based on the projection light as a real image or a virtual image.

12. The projection type display device according to claim 4,
wherein the projection unit projects the projection light onto the transparent projection surface so that a user who is present inside the vehicle visually recognizes the image based on the projection light as a real image or a virtual image.

13. The projection type display device according to claim 5,
wherein the projection unit projects the projection light onto the transparent projection surface so that a user who is present inside the vehicle visually recognizes the image based on the projection light as a real image or a virtual image.

14. The projection type display device according to claim 6,
wherein the projection unit projects the projection light onto the transparent projection surface so that a user who is present inside the vehicle visually recognizes the image based on the projection light as a real image or a virtual image.

15. The projection type display device according to claim 7,
wherein the projection unit projects the projection light onto the transparent projection surface so that a user who is present inside the vehicle visually recognizes the image based on the projection light as a real image or a virtual image.

16. The projection type display device according to claim 8,
wherein the projection unit projects the projection light onto the transparent projection surface so that a user who is present inside the vehicle visually recognizes the image based on the projection light as a real image or a virtual image.

17. A projection control method in a projection type display device including a projection display unit that includes a light source, a light modulation element that spatially modulates light emitted from the light source, and a projection unit that projects light spatially modulated by the light modulation element onto a transparent projection surface mounted in a vehicle as projection light; and a sight line detection unit that detects a line of sight of a driver of the vehicle, the method comprising:
controlling the projection of the projection light, stopping projection of the projection light onto the transparent projection surface by the projection display unit in a state where the line of sight detected by the sight line detection unit is out of the transparent projection surface and restarting the projection of the projection light onto the transparent projection surface by the projection display unit after a first time elapses after a timing of moment when the line of sight is determined to move from an outside of the transparent projection surface to an inside of the transparent projection surface,
wherein the projection display unit forms an image by the projection light reflected at the transparent projection surface so that the driver visually recognizes the image in conjunction with a scene outside the vehicle, and
wherein, in the step of controlling the projection of the projection light, visibility of the image formed by the projection light is gradually increased with the lapse of time in a case where the projection of the projection light onto the transparent projection surface is restarted.

18. The projection control method according to claim 17,
wherein, in the step of controlling the projection of the projection light, it is determined that the line of sight moves from the outside of the transparent projection surface to the inside of the transparent projection surface in a case where the line of sight detected by the sight line detection unit moves from a state where the line of sight detected by the sight line detection unit is out of the transparent projection surface to a state where the line of sight detected by the sight line detection unit is within the transparent projection surface and the line of sight detected by the sight line detection unit is continuously within the transparent projection surface for a second time.

19. The projection control method according to claim 17, wherein the projection unit projects the projection light onto the transparent projection surface so that a user who is present inside the vehicle visually recognizes the image based on the projection light as a real image or a virtual image.

20. The projection control method according to claim 18, wherein the projection unit projects the projection light onto the transparent projection surface so that a user who is present inside the vehicle visually recognizes the image based on the projection light as a real image or a virtual image.

21. The projection type display device according to claim 1, wherein the image formed by the projection light reflected at the transparent projection surface is a virtual image which is virtually formed at a position opposite to the driver with respect to the transparent projection surface when viewed from the driver.

22. The projection type display device according to claim 1, wherein the projection display unit forms the image including an icon, wherein the projection controller gradually increases visibility by increasing at least one of a size of the icon, a density of a painted color of the icon and a saturation of the icon with the lapse of time in a case where the projection of the projection light onto the projection surface is restarted.

* * * * *